Figure 1:
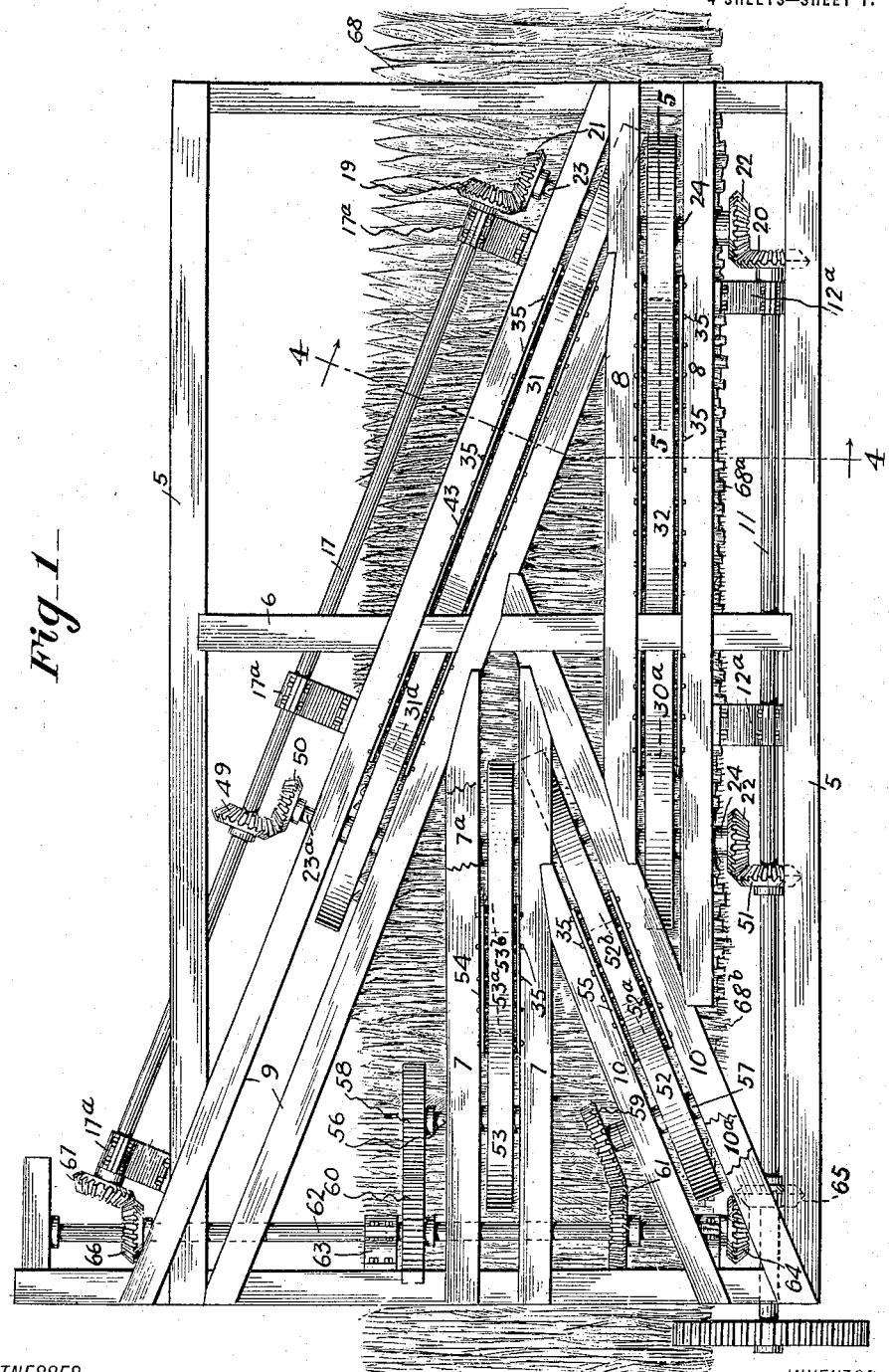

G. J. MAHIEU.
METHOD AND APPARATUS FOR DEFIBRATING FIBROUS VEGETABLE MATERIALS.
APPLICATION FILED APR. 15, 1914.

1,168,087.

Patented Jan. 11, 1916.
4 SHEETS—SHEET 1.

WITNESSES
Frank C. Palmer
Walton Harrison

INVENTOR
GEORGE J. MAHIEU
BY
ATTORNEYS

G. J. MAHIEU.
METHOD AND APPARATUS FOR DEFIBRATING FIBROUS VEGETABLE MATERIALS.
APPLICATION FILED APR. 15, 1914.

1,168,087.

Patented Jan. 11, 1916.
4 SHEETS—SHEET 3.

Fig. 3

WITNESSES
Frank C. Palmer
Walton Harrison

INVENTOR
GEORGE J. MAHIEU
BY
ATTORNEYS

G. J. MAHIEU.
METHOD AND APPARATUS FOR DEFIBRATING FIBROUS VEGETABLE MATERIALS.
APPLICATION FILED APR. 15, 1914.

1,168,087.

Patented Jan. 11, 1916.
4 SHEETS—SHEET 4.

WITNESSES
Frank C. Palmer
Walton Harrison

INVENTOR
GEORGE J. MAHIEU
BY
ATTORNEYS

UNITED STATES PATENT OFFICE.

GEORGE JOHN MAHIEU, OF RIO DE JANEIRO, BRAZIL.

METHOD AND APPARATUS FOR DEFIBRATING FIBROUS VEGETABLE MATERIALS.

1,168,087.

Specification of Letters Patent. Patented Jan. 11, 1916.

Application filed April 15, 1914. Serial No. 832,006.

*To all whom it may concern:*

Be it known that I, GEORGE J. MAHIEU, a citizen of the United States, residing at Rio de Janeiro, in the Republic of Brazil, have invented certain new and useful Improvements in Methods and Apparatus for Defibrating Fibrous Vegetable Materials, of which the following is a specification.

My invention relates to the removal or extraction of fiber from various vegetable material containing the same, and to cleaning all such fiber in order that the latter may be used in various arts.

More particularly stated I extract the fiber of various grasses, leaves and stems by stripping or scraping the pulp and woody matter away from the fibers by gripping the vegetable substances between separate pairs of gripping members provided for this purpose, the various pairs of gripping members moving bodily in paths more or less divergent, so as to produce a scraping action upon the vegetable material, in the general proximate direction of the length of the fiber thereof.

My invention further relates to provision for causing the various pieces of vegetable material to be subjected to the scraping action in such manner that one end of each piece is first operated upon, and then the other end of each piece is operated upon, the net result being that each stalk, stem, or bunch of the vegetable material is first defibrated at one of its ends and then defibrated at its other end.

My invention further relates to various improvements in methods and apparatus employed in defibration, for the purpose of improving the quality of the fiber produced, and cheapening the cost of defibration.

By my invention I also seek to avoid severity of action upon the fibers during the process of separating other vegetable material therefrom.

While my invention may be practised in many ways, and with a variety of distinct mechanisms, I will describe only one form of apparatus employed in connection with my method, it being understood, however, that this particular apparatus is merely representative or typical, and with my invention is not to be limited merely because I do not specifically describe other forms.

Reference is made to the accompanying drawings forming a part of this specification, and in which like letters indicate like parts.

Figure 2:
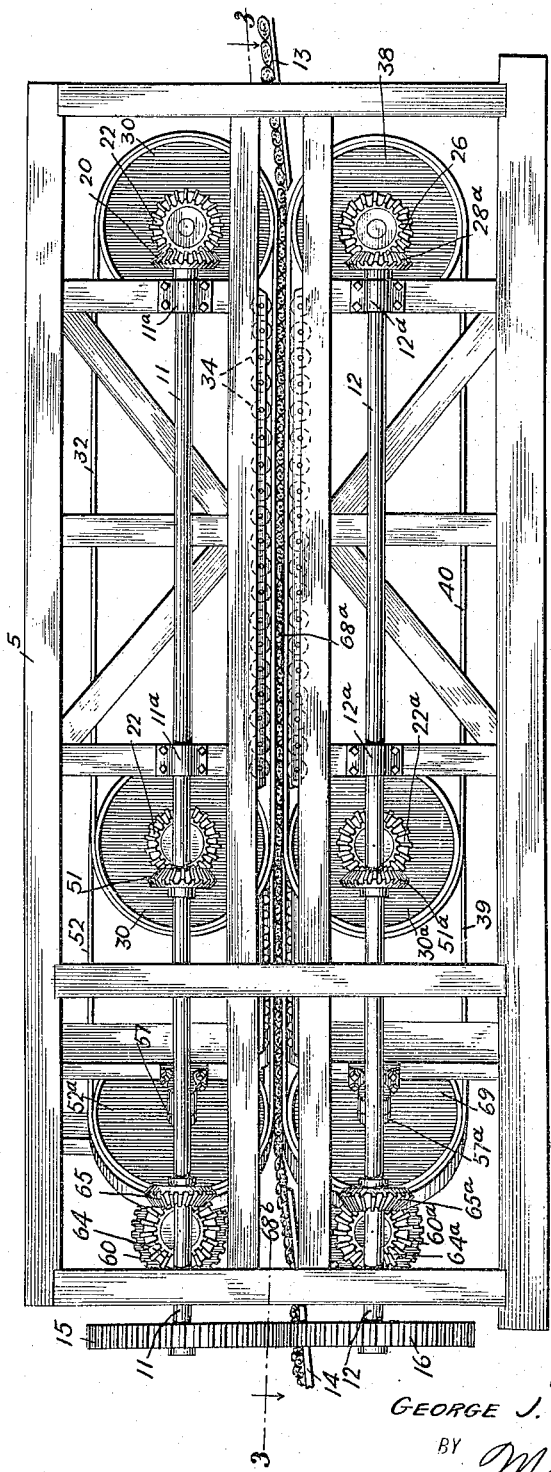
Figure 4:
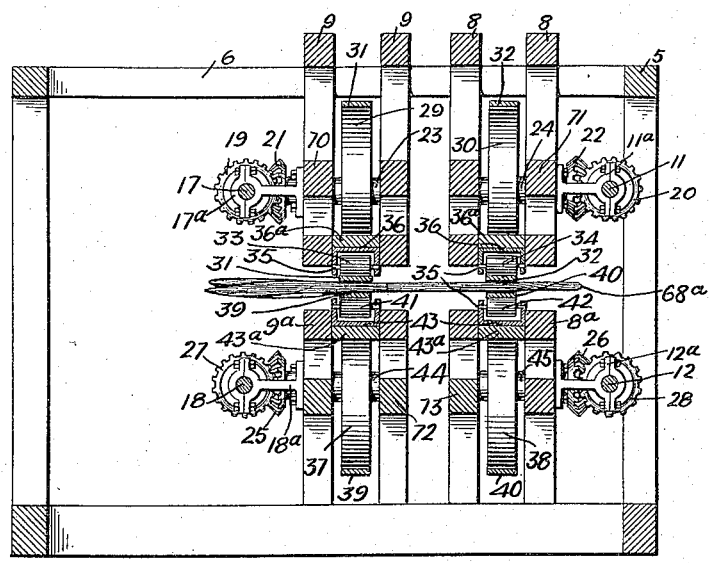
Figure 5:
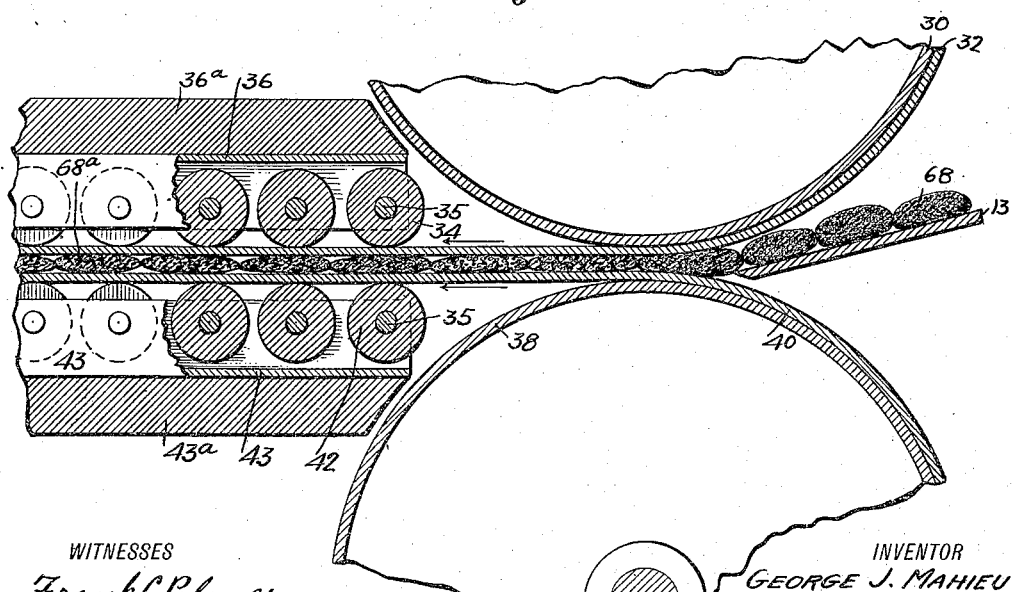

Figure 1 is a plan view of my machine, and shows a number of vegetable stems being fed through it and being defibrated. Fig. 2 is a side elevation of the same. Fig. 3 is a section on the line 3—3 of Fig. 2, looking in the direction of the arrow. Fig. 4 is a section on the line 4—4 of Fig. 1, looking in the direction of the arrow. Fig. 5 is a fragmentary section on the line 5—5 of Fig. 1, looking in the direction of the arrow.

The general frame of the machine is shown at 5, and is provided with a cross bar 6 and with a number of hanger bars 7, 7ª, 8, 9, 9ª, 10 and 10ª, arranged in pairs, some of these pairs extending in the general direction of the length of the frame, and others diverging from such direction, as may be understood more particularly from Figs. 1 and 3.

At 11 is a driving shaft, mounted in bearings 11ª and extending along the frame near the top thereof. At 12 is another driving shaft, extending parallel with the shaft 11, but located below the same and supported by bearings 12ª, as may be understood from Fig. 4. A feed board 13 and a delivery board 14 (see Fig. 2) are employed for convenience in handling the material to be operated upon.

Mounted upon the shaft 11 is a gear wheel 15, which meshes with another gear wheel 16, the latter being mounted upon the shaft 12. These parts are so arranged that when power is applied to the shaft 11, this shaft and the shaft 12 turn in opposite directions. Another revoluble shaft 17 is mounted in bearings 17ª, and parallel with this shaft and below the same is a revoluble shaft 18, mounted in bearings 18ª. Mounted rigidly upon one end of the shaft 17 is a bevel gear 19, and upon one end of the shaft 11 is a bevel gear 20. Meshing with the bevel gears 19, 20, are two other bevel gears 21, 22, which are mounted rigidly upon two shafts 23, 24. Below the bevel gears 21, 22 are two other bevel gears 25, 26, and meshing with these bevel gears are two other bevel gears 27, 28. Mounted rigidly upon the two shafts 23, 24 are two pulleys 29, 30. Engaging the pulley 30 is a belt 31 which also engages a pulley 31ª, the latter being mounted rigidly upon a revoluble shaft 23ª. Similarly a belt 32 engages the pulley 30 and also engages another pulley 30ª. The two belts 31 and 32 are endless, and the belt 31 extends obliquely in relation to the general direction of the belt 32. Engaging the inner surface of the belt 31, at the lower portion thereof, are a number of rollers 33, and similarly a number of rollers 34 engage the corresponding surface of the belt 32. The rollers 33, 34 are mounted upon pins 35, which are journaled in roller frames 36, the latter being secured to boards 36ª, as may be understood from Figs. 2 and 4.

Below the pulleys 29, 30, are two other pulleys 37, 38, and engaging these pulleys are belts 39, 40. These belts are endless, and their inner upper surfaces are engaged by rollers 41, 42 journaled in roller frames 43 and placed in juxta-position to the rollers 33 and 34, as may be understood from Figs. 4 and 5. The roller frames 43 are supported upon fixed boards 43ª. The pulleys 37, 38 are mounted rigidly upon shafts 44, 45 and support the belts 39, 40, the upper portions of the latter engaging the rollers 41, 42. Mounted rigidly upon the shaft 17 is a bevel gear 49, which meshes with another bevel gear 50, the latter being mounted rigidly upon the shaft 23ª. A bevel gear 51 is mounted rigidly upon the shaft 11, and meshes with the bevel gear 22. A bevel gear 51ª, mounted rigidly upon the shaft 12, meshes with the bevel gear 22ª, as indicated in Fig. 2. A belt 52 is mounted upon pulleys 52ª, 52ᵇ, and similarly a belt 53 is mounted upon pulleys 53ª, 53ᵇ, these belts and pulleys being similar to others above described.

At 54 and 55 are roller frames, containing rollers similar to the rollers 34 and 42 described elsewhere, these rollers engaging the belts 52 and 53. The pulley 53ª is mounted rigidly upon a shaft 56, and the pulley 52ª is similarly mounted upon a shaft 57. The shaft 56 carries a gear wheel 58, and the shaft 57 carries a gear wheel 59. These gear wheels mesh respectively with gear wheels 60, 61, both of the latter being mounted rigidly upon a shaft 62. This shaft is revolubly supported in bearings 63. Mounted upon one end of the shaft 62 is a bevel gear 64, which meshes with a bevel gear 65 carried by the shaft 11. Another bevel gear 66 is mounted rigidly upon the shaft 62, and meshes with a bevel gear 67, the latter being mounted rigidly upon one end of the shaft 17. The stock, or vegetable material to be operated upon, is shown in its original form at 68.

At 68ª and 68ᵇ, the stock is shown as it appears after being operated upon to some extent, during its passage through the machine. Below the pulley 52ª is a similar pulley 69, which partially supports the belt 39. A number of sub-frames 70, 71, 72, 73 (see Fig. 4) are provided for the purpose of supporting the various shafts, pulleys, and other movable parts.

The bevel gear 64ª (see Fig. 3) is mounted rigidly upon a shaft 74 extending across the frame work. Mounted upon the shaft 74 is a bevel gear 76, which meshes with another bevel gear 77, the latter being mounted rigidly upon a shaft 78 which is journaled in the frame work. In operative relation to the shaft 78 is a belt 79, which engages rollers 80. Mounted rigidly upon the shaft 74 is a bevel gear 60ª, which meshes with a bevel gear 81, the latter being mounted rigidly upon the shaft 57ª. The shaft 74 is provided with a bevel gear 82 which meshes with a bevel gear 83 carried by the shaft 18 for the purpose of driving the latter. The shaft 18 carries a bevel gear 84 which meshes with another bevel gear 85, the latter being used in connection with the driving of the belt 39.

Generally speaking, the mechanism in the lower portion of the main frame 6 is similar to the mechanism in the upper portion thereof, so that virtually the upper and lower portions of the mechanism mate each other, part for part, each movable member in the upper portion of the frame having its counterpart in the lower portion thereof. The revoluble movements of the movable parts in the lower portion of the main frame, however, are in the opposite direction to those of the corresponding parts in the upper portion of said frame.

The two belts of each pair, for instance the belts 32 and 40, are so placed, relatively to each other and to the rollers adjacent them, that the space between the belts is practically a slot, and the stock or material to be operated upon is gripped in this slot, with a fair degree of firmness. The two slots below the two belts 53 and 32 extend in the same direction as the general length of the main frame, but the other two slots, below the belts 31 and 52, diverge from the slots first-mentioned, at angles which are apportioned according to the material to be operated upon, and which may in a particular machine vary from 20 degrees to 90 degrees. The pulleys and rollers may be provided with spikes for engaging the belts in order to prevent lateral slipping thereof. As some of the slots diverge from others, if the stock be fed through the machine, as indicated in Fig. 1, the gripping mechanism must pull upon the stock endwise, as the stock travels along, and in this manner the pulp and various woody parts of the material are stripped off, so as to leave the fiber. All strain thus placed upon the fiber is in the general direction of the length thereof, and no strain placed upon the fiber is sufficient to break it or seriously impair its tensile strength. The action of the gripping mechanism is such as to scrape the stock in a manner more or less analogous to that in which a person might scrape the stock with his finger nails—the scraping action being comparatively slow and taking place in the general direction of the length of the fiber.

The operation of my device is as follows: The various parts being assembled and arranged as described, and power being applied to the shaft 11, so that all of the movable parts are thrown into action, the stock 68 is fed into the machine, passing over the feed board 13. Each piece of stock is gripped, adjacent one of its ends, between the belts 32 and 40, and thus held tightly in position, and at the same time fed along in the general direction in which the adjacent portions of these belts are journaled. The stock is next gripped between the belts 31 and 39, and as these belts diverge from the belts just mentioned, each piece of stock is scraped toward one of its ends. Afterward, as the stock passes further through the machine, it is gripped by other belts, and each piece is scraped toward the end opposite the one which was scraped at first. The net result is that each stem, stalk, or other vegetable member is scraped first in one direction toward one end of the piece, and then scraped in the opposite direction toward the opposite end of the piece.

The scraping, brought about as above described does not injure the fiber, and leaves the latter in good condition to be worked upon afterward.

Having thus described my invention, what I claim as new and desire to secure by Letters Patent is as follows:

1. The method herein described of treating fibrous vegetable material for the purpose of removing the fiber thereof, which consists in gripping different portions of the same piece of stock by means of gripping members traveling in divergent paths and applied thereto, and causing every part of said stock to remain continuously on the same plane relatively to said gripping members for the purpose of causing said gripping members to scrape upon said stock in virtue of the divergence of their paths.

2. The method herein described of treating fibrous vegetable material for the purpose of extracting the fiber therefrom, which consists in gripping the material in slots one of which diverges relatively to another and causing every part of said material to travel in the same plane which contains these slots, in the general longitudinal direction of the length of one of these slots, wherein it shall be firmly gripped, so that said material, because of the divergence of said slots, is scraped in the general direction of the fiber of such material, by slipping between the sides of the other slots which do not grip it so firmly, letting pass the fiber but retaining the pulp and other impurities.

3. In a device of the character described, the combination of a frame, a plurality of endless members movably mounted within said frames and disposed in pairs, the endless members of each pair diverging from the endless members of another pair while moving in the same general longitudinal direction, and means for holding the members of each pair in gripping contact with the stock to be operated upon, maintaining the said stock in the same plane throughout its passage through the device.

4. A device of the character described comprising a frame, a plurality of pulleys journaled therein, endless members mounted upon said pulleys and disposed in pairs, the constituents of each pair having adjacent portions separated from each other so as to form virtually a slot therebeween, and rollers engaging said adjacent portions of said members for the purpose of pressing them toward each other and thus causing said members to grip the material to be operated upon, some of said members diverging from others while maintaining the same general longitudinal direction of movement, in order to produce a scraping effect lengthwise of the stock to be operated upon.

5. A device of the character described, comprising a frame, roller guides mounted therein, rollers journaled within said roller guides, movable members engaging said rollers and arranged in pairs, the constituents of each pair having oppositely disposed portions close together for the purpose of gripping pieces of stock and carrying same along the same general longitudinal direction, and means for pulling upon each piece of stock in the general direction of the length thereof, which shall lie in the same plane, by causing a divergence in the paths of the said pairs of members in order to cause them to scrape said pieces of stock.

6. A device of the character described, comprising a plurality of gripping members for gripping different portions of the material to be operated upon, and means for moving said gripping members along in longitudinal paths, one of which diverges from another, in order to scrape the pieces of stock in the general direction of the length thereof.

7. A device of the character described, comprising a frame, a plurality of pulleys journaled therein, endless conveyer members mounted upon said pulleys and disposed in pairs, the constituents of each pair having adjacent portions separated from each other so as to form virtually a slot therebetween, and rollers engaging adjacent portions of said conveyer members for the purpose of pressing together toward each other and thus causing said conveyer members to grip the material to be operated upon, some of said conveyer members diverging from others, the adjacent portions of said conveyer members at the points where they engage said material being so located as to travel in the same general longitudinal direction of movement, in order to produce a scraping effect lengthwise of the stock to be operated upon.

8. A device of the character described, comprising a plurality of gripping members for gripping different portions of the material to be operated upon, and means for moving said gripping members along in longitudinal paths, one of which diverges from another, all of said paths however, having a general proximate longitudinal direction of travel in order to scrape the pieces of stock in the general direction of the length of the fiber thereof.

In testimony whereof I have signed my name to this specification in the presence of two subscribing witnesses.

GEORGE JOHN MAHIEU.

Witnesses:
RICHARD P. MOMSER,
SAMUEL W. HONAKER.

Copies of this patent may be obtained for five cents each, by addressing the "Commissioner of Patents, Washington, D. C."